US006274276B1

(12) United States Patent
Andrieu et al.

(10) Patent No.: US 6,274,276 B1
(45) Date of Patent: *Aug. 14, 2001

(54) ORGANIC ELECTROLYTE ELECTROCHEMICAL SYSTEM INCLUDING A POLYMERIC SEPARATOR

(75) Inventors: Xavier Andrieu, Bretigny sur Orge; François Boudin, La Ville du Bois, both of (FR); Ib Ingemann Olsen, Cockeysville, MD (US)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/977,051

(22) Filed: Nov. 25, 1997

(30) Foreign Application Priority Data

Jul. 17, 1997 (FR) .................................................. 97 09072

(51) Int. Cl.⁷ ..................................................... H01M 2/16
(52) U.S. Cl. .......................... 429/251; 429/249; 429/129; 429/254
(58) Field of Search .................................... 429/251, 249, 429/129, 254

(56) References Cited

U.S. PATENT DOCUMENTS

| 3,023,261 | 2/1962 | Louis et al. | 429/137 |
|---|---|---|---|
| 4,524,509 | 6/1985 | Wegner | 29/623.5 |
| 4,885,007 | 12/1989 | Wegner | 29/623.5 |
| 5,346,788 | * 9/1994 | Chang et al. | 429/244 |
| 5,437,692 | 8/1995 | Dasgupta et al. | 29/623.1 |
| 5,503,946 | 4/1996 | Fauteux et al. | 429/50 |
| 5,637,421 | 6/1997 | Poehler | 429/190 |
| 5,665,265 | * 9/1997 | Gies et al. | 429/303 |
| 5,989,750 | * 11/1999 | Ohba et al. | 429/251 |

FOREIGN PATENT DOCUMENTS

| 0 038 885 A1 | 11/1981 | (EP) . |
|---|---|---|
| 0 243 653 A3 | 11/1987 | (EP) . |
| 0 511 491 A1 | 11/1992 | (EP) . |
| 0 600 718 A3 | 6/1994 | (EP) . |
| 0 618 629 A1 | 10/1994 | (EP) . |
| WO 96/20504 | 7/1996 | (WO) . |

OTHER PUBLICATIONS

6001 Chemical Abstracts, 118 (1993) Apr. 19, No. 16, corresponding to JP 4239041.

* cited by examiner

Primary Examiner—Laura Weiner
(74) Attorney, Agent, or Firm—Sughrue, Mion, Zinn, Macpeak & Seas, PLLC

(57) ABSTRACT

A polymeric separator for an organic electrolyte electrochemical system comprises an elastomeric polymer, optionally, a polymer which swells in the organic electrolyte and with which the elastomeric polymer forms an alloy and, optionally, an inorganic compound. The polymeric separator has a microporous structure characterized by a porosity in the range 30% to 95% and pores with an average diameter in the range 0.1 $\mu$m to 5 $\mu$m

7 Claims, 5 Drawing Sheets

FIG_1

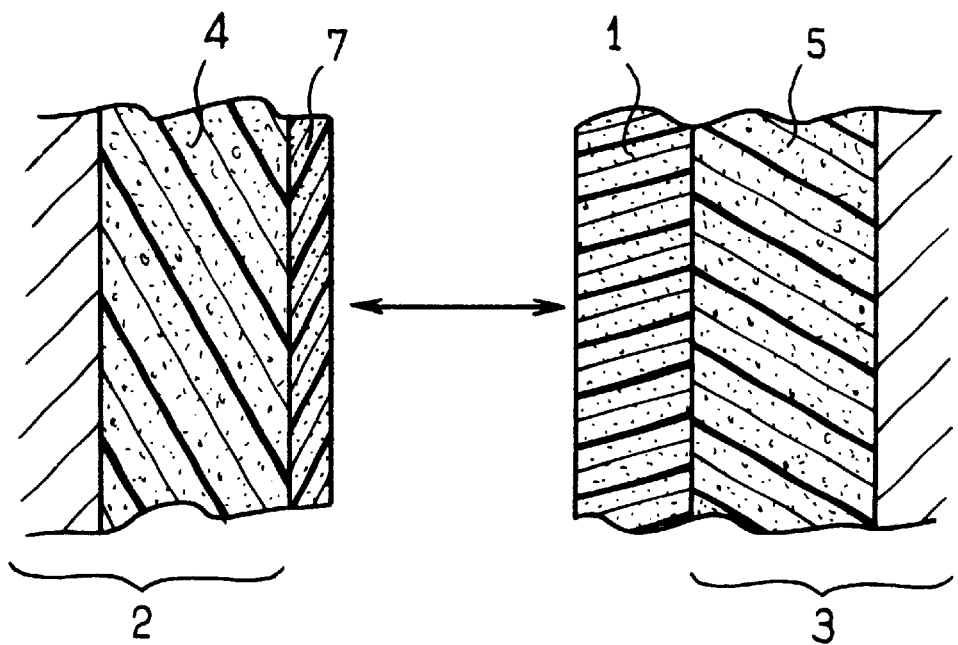
FIG_6
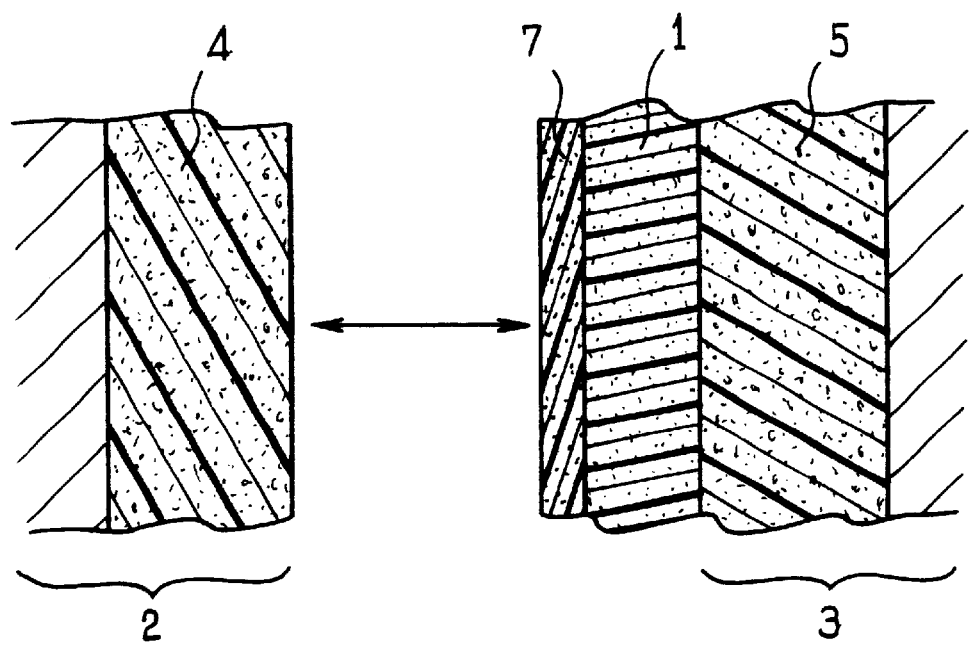
FIG_7

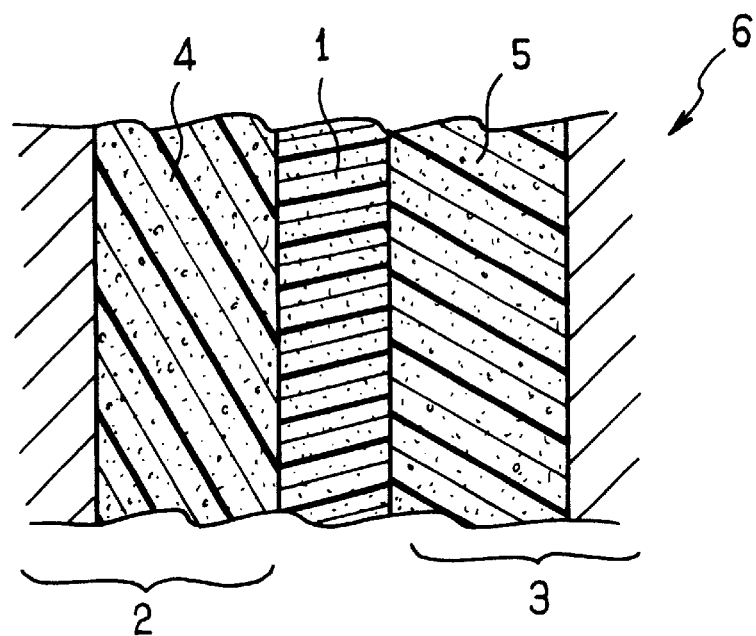
FIG_8
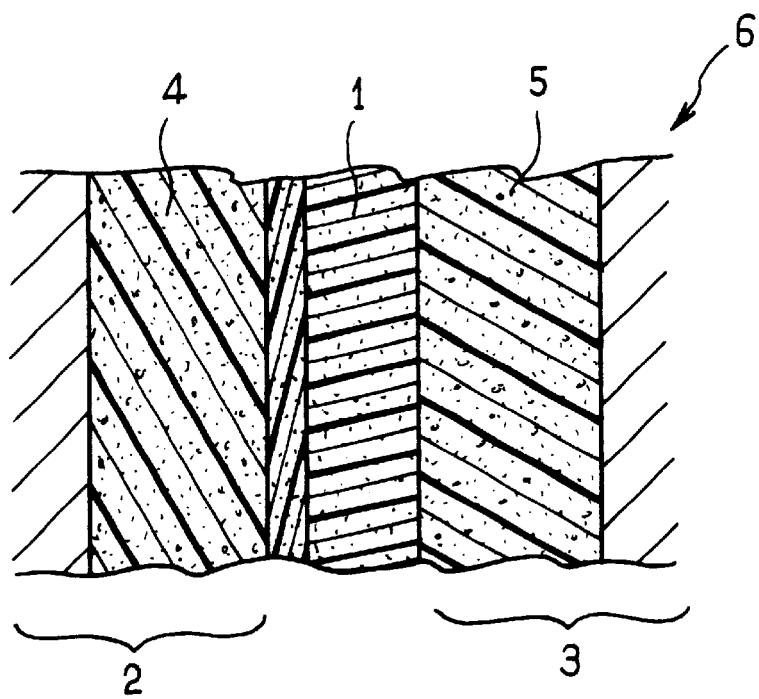
FIG_9

ORGANIC ELECTROLYTE ELECTROCHEMICAL SYSTEM INCLUDING A POLYMERIC SEPARATOR

BACKGROUND OF THE INVENTION

1. Field of the Invention

The present invention concerns a polymeric separator for an organic electrolyte electrochemical system, and a process for its production.

It also concerns an electric cell comprising the separator of the invention and a process for the production of an electric cell comprising that separator.

2. Description of the Prior Art

"Solid" organic electrolyte electrochemical systems, in particular cells and supercapacitors, include electrodes around a layer of porous electrically insulative material impregnated with electrolyte, termed a separator.

The separator must have good intrinsic mechanical behavior and a good affinity for the organic electrolyte. Polymeric materials, in particular polyvinylidene fluoride (PVDF) satisfy those two criteria and are conventionally used for the separator.

Polyvinylidene fluoride (PVDF) in particular is widely used. However, as it dries, a PVDF based separator tends to undergo large dimensional variants which can result in the electrode and separator, or even the electrode and the metallic current collector, separating.

The present invention proposes a polymeric separator for an organic electrolyte electrochemical system in which dimensional variants are minimized, by replacing some or all of the PVDF by an elastomeric polymer or by an alloy of an elastomeric polymer with a polymer which swells in the electrolyte.

SUMMARY OF THE INVENTION

The present invention provides a polymeric separator for an organic electrolyte electrochemical system comprising:
a) an elastomeric polymer;
b) optionally, a polymer which swells in the organic electrolyte and with which the elastomeric polymer forms an alloy; and
c) optionally, an inorganic compound; the polymeric separator having a microporous structure characterized by a porosity in the range 30% to 95% and pores with an average diameter in the range 0.1 $\mu$m to 5 $\mu$m.

The average pore diameter is preferably of the order of 1 $\mu$m.

The elastomeric polymer improves the mechanical properties of the separator by limiting dimensional variants.

The elastomeric polymer can be selected from polyurethanes, an acrylonitrile-butadiene copolymer, a styrene-butadiene-styrene copolymer, a styrene-isoprenestyrene copolymer, polyesters and block amide polyethers.

The elastomeric polymer, the main function of which is to improve the mechanical properties of the separator, can advantageously swell in the organic electrolyte. An example of such an elastomeric polymer is polycarbonate-polyurethane.

The polymer which swells in the organic electrolyte must have a certain affinity with the electrolyte but without dissolving in the electrolyte at temperatures in the range 50° C. to 80° C.

The polymer which swells in the organic electrolyte can be selected from polyvinylidene fluoride and its copolymers, polyacrylonitrile, polymethylmethacrylate, polyvinylformal, polybutylmethacrylate and polyvinyl chloride.

The inorganic compound, such as silica, can improve the mechanical properties and the absorption properties of the separator.

The polymeric separator of the invention advantageously contains 40% to 100% of elastomeric polymer, 0 to 60% of the polymer which swells in the electrolyte and 0 to 20% of the inorganic compound.

The present invention also concerns a process for the production of the polymeric separator described above.

The process of the invention is advantageously based on phase inversion of the polymer or polymers selected for the separator.

A first or "immersion" variant of the invention comprises the following steps:
  forming a solution comprising the elastomeric polymer, the polymer which swells in the organic electrolyte, and optionally the inorganic compound, dissolved in a solvent which is common to the two polymers;
  spreading the solution on a support in the form of a film;
  immersing the film in a non-solvent which is miscible with the solvent; and
  drying the film to eliminate the solvent and the non-solvent.

A second or "evaporation" variant of the process of the invention comprises the following steps:
  forming a solution comprising the elastomeric polymer, the polymer which swells in the organic electrolyte, and optionally the inorganic compound, dissolved in a solvent which is common to the two polymers, to which is added a non-solvent which is miscible with the solvent in a proportion which is insufficient to cause precipitation of the polymer or polymers;
  spreading the solution on a support in the form of a film; and
  drying the film to eliminate the solvent and the non-solvent.

The term "solvent" means an organic solvent in which the polymer or polymers dissolve without difficulty and which can be readily eliminated by heating to a moderate temperature.

The term "non-solvent" means a liquid in which the polymer or polymers are not soluble (strong non-solvent) or are only very slightly soluble (weak non-solvent) at the operating temperature. When the selected non-solvent is water, either pure or as a mixture, this temperature is in the range 5° C. to 80° C.

In the second variant of the process for the production of the separator of the invention the solution can be heated before being spread over the support.

The boiling point of the solvent is preferably lower than the boiling point of the non-solvent. Thus during evaporation the solution becomes richer in non-solvent until the polymeric phase becomes insoluble in the liquid and precipitates out.

The solution is spread over the support using a known method such as dipping, coating or spraying.

In the first and second variants of the process of the invention the solvent is selected so that it dissolves the elastomeric polymer, the polymer which swells in the organic electrolyte, when present, and 15% to 30% of the polymer alloy.

The solvent is an organic solvent selected from cyclohexanone, dichloromethane, dimethylacetamide (DMA), dimethylformamide (DMF), hexamethylphosphoramide (HMPA), dimethylsulfoxide (DMSO), triethylphosphate (TEP), N-methylpyrrolidone (NMP), and mixtures thereof.

The non-solvent is selected from water, ethanol, ethylene glycol, glycerol, acetone, propylene carbonate, dichloromethane, ethyl acetate, butanol, pentanol, acetonitrile, and mixtures thereof.

If the selected non-solvent is water the process of the invention has the advantage of not contaminating the environment and facilitating solvent recycling.

The solution of polymer or polymers in the solvent is a concentrated solution. The concentration of polymer(s) is one of the parameters which conditions the porosity of the film. This concentration must not be too high. The solution preferably contains at least 50% solvent.

The film is preferably dried in two stages, firstly at a temperature which is in the range 20° C. to 60° C. and then at a temperature in the range 80° C. to 140° C.

In a third variant of the process for the production of the separator of the invention phase inversion is carried out by cryoprecipitation.

In the first and second variants of the phase inversion process for the production of the separator the support is advantageously a sheet of a chemically inert material which is separated from the film once it has dried.

When the organic electrolyte electrochemical system comprises at least two electrodes each comprising a porous layer containing an electrochemically active material and a binder the support is advantageously the porous layer of one of the electrodes or the porous layer of each of the electrodes.

When the support is the porous layer of one of the electrodes a bifunctional electrode is obtained. The electrode comprises a first electronically conductive porous layer coated with a second microporous layer constituting the separator.

When the support is the porous layer of each of the electrodes two bifunctional electrodes are obtained. Each comprises a first porous layer which is electronically conductive coated with a second microporous layer constituting one half of the separator.

The present invention also concerns an organic electrolyte electric cell comprising the separator of the invention which can be obtained using one of the three variants of the process described above.

The electric cell of the invention comprises an electrode, anode or cathode, and a counter-electrode of the conventional type.

The electric cell advantageously contains an electrolyte which comprises a lithium salt dissolved in an organic solvent.

The lithium salt is selected from:
lithium perchlorate $LiClO_4$,
lithium hexafluoroarsenate $LiAsF_6$,
lithium hexafluorophosphate $LiPF_6$,
lithium tetrafluoroborate $LiBF_4$,
lithium trifluoromethanesulfonate $LiCF_3SO_3$,
lithium trifluoromethanesulfonimide $LiN(CF_3SO_2)_2$, and
lithium trifluoromethanesulfonemethide $LiC(CF_3SO_2)_3$.

The organic solvent is a mixture of ethers and/or esters, the esters being selected from linear carbonates and cyclic carbonates containing more than four carbon atoms, such as propylene, ethylene, butylene, diethyl or dimethyl carbonates, and mixtures thereof.

The electric cell advantageously comprises an anode, the electrochemically active material thereof being carbon, a cathode, the electrochemically active material thereof being a transition metal oxide such as mixed nickel and lithium oxide ($LiNiO_2$), and an electrolyte based on cyclic esters.

The present invention provides a process for the production of an organic electrolyte electric cell. The process is carried out by heat sealing or by adhesive bonding or by simple assembly of the elements constituting the cell.

The present invention concerns a process for the production of an organic electrolyte electric cell comprising:
  at least two electrodes each comprising a porous layer containing an electrochemically active material and a binder; and
  the separator of the invention, obtainable by the process described above; which process comprises a step for assembling the separator and electrodes to form an electrochemical couple comprising the separator located between the porous layer sides of the two electrodes.

Firstly, the present invention concerns a process for the production of an electric cell by heat sealing.

A first embodiment of the process comprises the following steps:
  impregnating the porous layer sides of the electrodes and the separator with the electrolyte; and
  carrying out the assembly step by uniting the separator with the porous layer sides of both of the electrodes.

In this first embodiment the separator is advantageously produced using the process of the invention by selecting a plate of a chemically inert material as the support which is separated from the film once it has dried.

A second embodiment of the process for the production of the electric cell of the invention comprises the following steps:
  producing the separator by the process of the invention, selecting the porous layer of one of the electrodes as the support such that the porous layer side of one of the electrodes is covered with the separator and the separator has a free face;
  impregnating the free face side of the separator with the electrolyte;
  impregnating the porous layer side of the other electrode with the electrolyte; and
  carrying out the assembly step by uniting the free face side of the separator with the porous layer side of the other electrode.

A third embodiment of the process for the production of the electric cell of the invention comprises the following steps:
  producing the separator by the process of the invention, selecting the porous layer of each of the electrodes as the support such that the porous layer side of each of the two electrodes is covered with half of the separator and each half of the separator has a free face;
  impregnating the free face side of each half of the separator with the electrolyte; and
  carrying out the assembly step by uniting the free face sides of the separator halves.

After the assembly step of either of the above embodiments, pressure is exerted on the electrochemical couple while heating it to a temperature which is less than or equal to the temperature at which fusion of the separator impregnated with electrolyte commences.

The present invention concerns a process for the production of an electric cell by adhesive bonding.

A fourth embodiment of the process for the production of an electric cell of the invention comprises the following steps:

producing the separator by the process of the invention, selecting the porous layer of one of the electrodes as the support such that the porous layer side of one of the electrodes is covered with the separator and the separator has a free face;

coating the free face side of the separator with a film of adhesive and/or coating the porous layer side of the other electrode with a film of adhesive; and carrying out the assembly step by uniting the separator and the other electrode and exerting slight pressure on the electrochemical couple formed.

After the assembly step of the fourth embodiment the electrochemical couple is impregnated with the electrolyte after optional drying of the couple.

In a first variant of this process, the adhesive is a solution containing:

a polymer with the same chemical formula as the polymer constituting the separator;

a solvent in which the polymer readily dissolves at the adhesive preparation temperature; and a non-solvent which is miscible with the solvent, which does not or only slightly dissolves the polymer at the adhesive preparation temperature and the proportion of which is insufficient to cause precipitation of the polymer.

In this first variant the free face side of the separator is preferably coated with a film of adhesive.

The boiling point of the solvent is preferably in the range 40° C. to 80° C. and the boiling point of the non-solvent is over 100° C.

The solvent and non-solvent are advantageously the same as those used to produce the separator by the process of the invention.

The electrochemical couple is optionally rolled, then dried for 10 minutes at a temperature of about 20° C., then vacuum dried for about 12 hours.

In a second variant of the process the adhesive is a paste constituted by the electrochemically active material of the porous layer of one of the electrodes, a polymer and a solvent which dissolves the polymer.

In this second variant the porous layer side of the first electrode is preferably coated with a film of adhesive.

The polymer is advantageously the same as that used as a binder constituting the porous layer of the first electrode.

The polymer is preferably selected from polytetrafluoroethylene, carboxymethylcellulose, hydroxypropylmethylcellulose, hydroxyethylcellulose, hydroxypropylcellulose, polyvinylidene fluoride and its copolymers, polyacrylonitrile, polyacrylic acid, polyacrylamide and mixtures thereof.

The solvent is selected from water and N-methylpyrrolidone.

The electrochemical couple formed can optionally be rolled before being dried for 10 minutes at a temperature of about 80° C.

The present invention also concerns a process for the production of an electric cell according to the invention by a "simple assembly" process.

More precisely, the invention concerns a process for the production of an organic electrolyte electric cell comprising at least two electrodes and the separator of the invention obtainable by the process of the invention wherein the electrodes and the separator are impregnated with electrolyte and one of the electrodes, the separator and the other electrode are superposed in that order to form an electrochemical couple.

The "simple assembly" process comprises no step other than assembly of the separator and the two electrodes.

Further features and advantages of the present invention will become apparent from the following example and the accompanying figures which are given by way of non-limiting illustration.

BRIEF DESCRIPTION OF THE DRAWINGS

FIGS. 6 and 7 each represent one embodiment of the process of the invention for the production of an electric cell carried out by adhesive bonding.

FIG. 8 represents the electrochemical couple obtained by any of the embodiments shown in FIGS. 3, 4 and 5.

FIG. 9 represents the electrochemical couple obtained by either of the embodiments shown in FIGS. 6 and 7.

DETAILED DESCRIPTION OF THE PREFERRED EMBODIMENTS

FIGS. 3 to 7 represent various embodiments of a process for assembling an organic electrolyte electric cell comprising:

two electrodes 2 and 3 each comprising a porous layer 4 or 5 containing an electrochemically active material and a binder; and a separator 1, 1a and 1b of the invention obtainable by the process of the invention.

Figure 3:
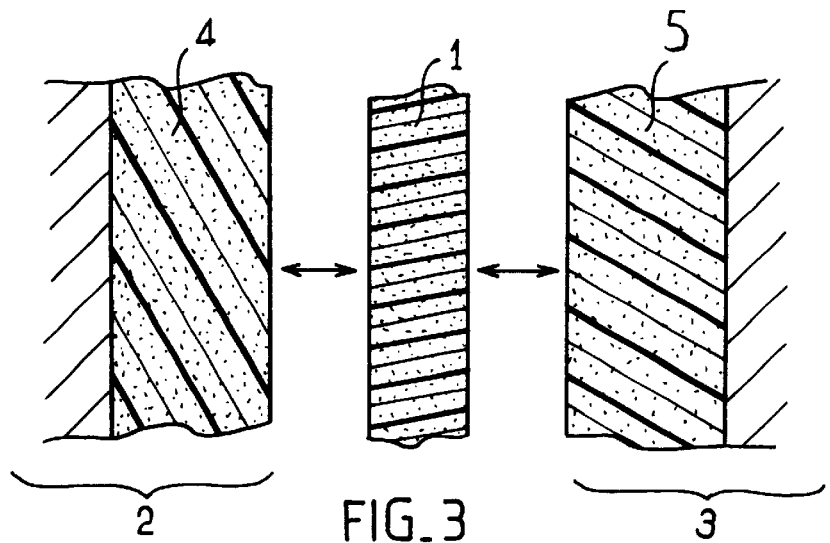
FIGS. 3, 4 and 5 each represent one embodiment of the process of the invention for the production of an electric cell carried out by heat sealing.
Figure 4:
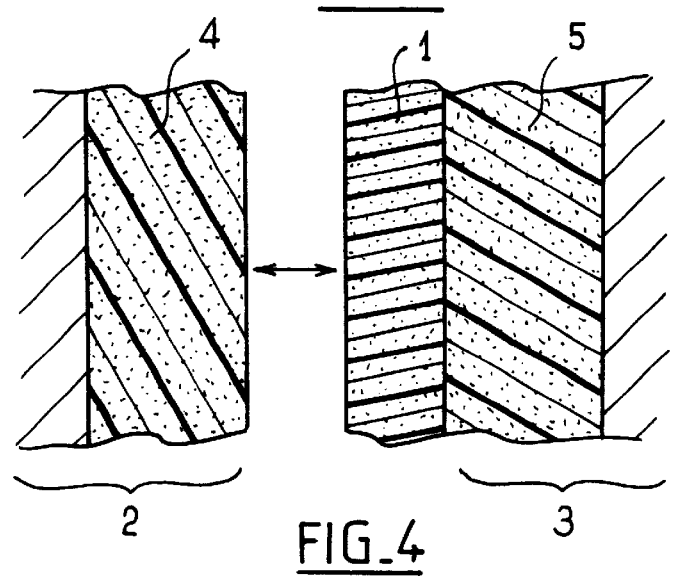
Figure 5:
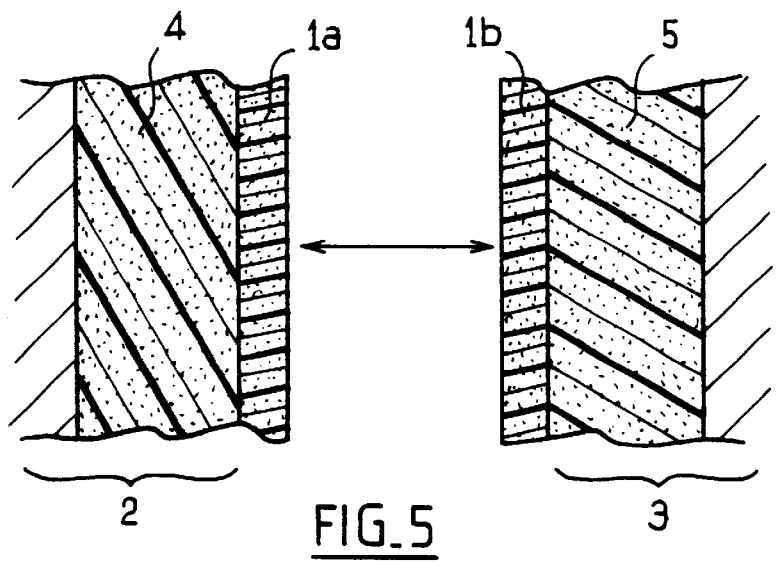

FIGS. 3 to 5 shows three embodiments of the assembly process by heat sealing.

In FIG. 3:

a separator 1 of the invention is supplied or a separator 1 is produced using the process of the invention, selecting a plate of a chemically inert material as the support which is separated from separator 1 once it has dried;

the porous layer side 4 or 5 of electrodes 2 and 3 are impregnated with the electrolyte;

separator 1 is impregnated with the electrolyte; and the porous layer side 4 of electrode 2 is united with separator 1 and the porous layer 5 side of electrode 3, in that order.

In FIG. 4:

a separator 1 of the invention is produced using the process of the invention, selecting the porous layer 5 of electrode 3 as the support so that separator 1 has a free face;

the free face side of separator 1 is impregnated with the electrolyte;

the porous layer side 4 of the other electrode 2 is impregnated with the electrolyte; and the free face of separator 1 and the porous layer 4 side of electrode 2 are united.

In FIG. 5:
separator 1a and 1b is produced in two steps to obtain two separator halves 1a and 1b. Separator half 1a of the invention is produced by selecting the porous layer 4 of electrode 2 as the support and separator half 1b of the invention is produced by selecting the porous layer 5 of electrode 3 as the support, such that each separator half 1a and 1b has a free face;

the free face side of each separator half 1a and 1b is impregnated with the electrolyte; and the free face sides of the two separator halves 1a and 1b are united.

FIGS. 6 and 7 represent two embodiments of the assembly process by adhesive bonding in which separator 1 is produced by the process of the invention by selecting the porous layer 5 of electrode 3 as the support so that separator 1 has a free face.

In FIG. 6, after producing the separator as described above:
the porous layer 4 of electrode 2 is coated with a film of adhesive 7; and the free face side of separator 1 and the porous layer 4 side of electrode 2 coated with an adhesive film 7 are united.

In a preferred embodiment the adhesive is a paste constituted by the same electrochemically active material as that of the porous layer 4, a polymer and a solvent which dissolves the polymer.

In FIG. 7, after producing the separator as described above:
the free face side of separator 1 is coated with an adhesive film 7; and the free face side of the separator coated with adhesive film 7 is united with the porous layer 4 side of electrode 2.

In a preferred embodiment the adhesive is a solution containing:
a polymer with the same chemical formula as the polymer constituting separator 1;

a solvent in which the polymer readily dissolves at the adhesive preparation temperature; and a non-solvent which is miscible with the solvent, which does not dissolve or very slightly dissolves the polymer at the adhesive preparation temperature and the proportion of which is insufficient to cause the polymer to precipitate.

FIG. 8 shows the electrochemical couple 6 obtained using one embodiment of the heat sealing process described in FIGS. 3, 4 and 5.

Pressure is then exerted on electrochemical couple 6 while heating it to a temperature which is less than or equal to the temperature at which fusion of separator 1 impregnated with electrolyte commences.

FIG. 9 shows the electrochemical couple 6 obtained using one of the embodiments of the adhesive bonding process of FIGS. 6 and 7.

The electrochemical couple 6 is then impregnated with the electrolyte after being dried.

Example: Production of a cell comprising a separator constituted by polyurethane and polyacrylonitrile by the simple assembly process.

A positive electrode constituted by a copper collector was used, on which a porous layer constituted by 90% by weight of graphite and a polyvinylidene fluoride polymeric binder had been deposited.

A solution of polymers was prepared containing 70% by weight of polyurethane (Estane® 5714 F1 from GOODRICH) and 30% by weight of polyacrylonitrile (from ALDRICH) in N-methylpyrrolidone. The N-methylpyrrolidone represented 83% by weight of the solvent-polymer mixture.

The prepared solution of polymers was coated onto the porous graphite layer of the positive electrode using a coating table.

The positive electrode coated with a film of polymer solution was then immersed in a non-solvent, water, for half an hour, then dried at 50° C. for 12 hours.

Once dried, the positive electrode was coated with a separator constituted by a porous white polymeric film with 60% porosity.

To test the electrode prepared in this way, a button type electric cell was produced using a negative electrode comprising an aluminum collector on which a porous layer containing $LiNiO_2$ as the electrochemically active material and a polyvinylidene fluoride binder had been deposited.

The separator covering the positive electrode and the porous layer of the negative electrode were impregnated with electrolyte. The electrolyte was a propylene carbonate/ethylene carbonate/dimethyl carbonate mixture in a proportion of 1/1/3 in which 1 M $LiPF_6$ had been dissolved.

The positive and negative electrodes were assembled so that the porous layer of the negative electrode and the separator covering the positive electrode were face to face.

The electrochemical couple obtained was placed in a can which was closed by a cap to form a button type cell.

The cell was cycled at a charge rate of C/20 and a discharge rate of C/5.

Figure 1:
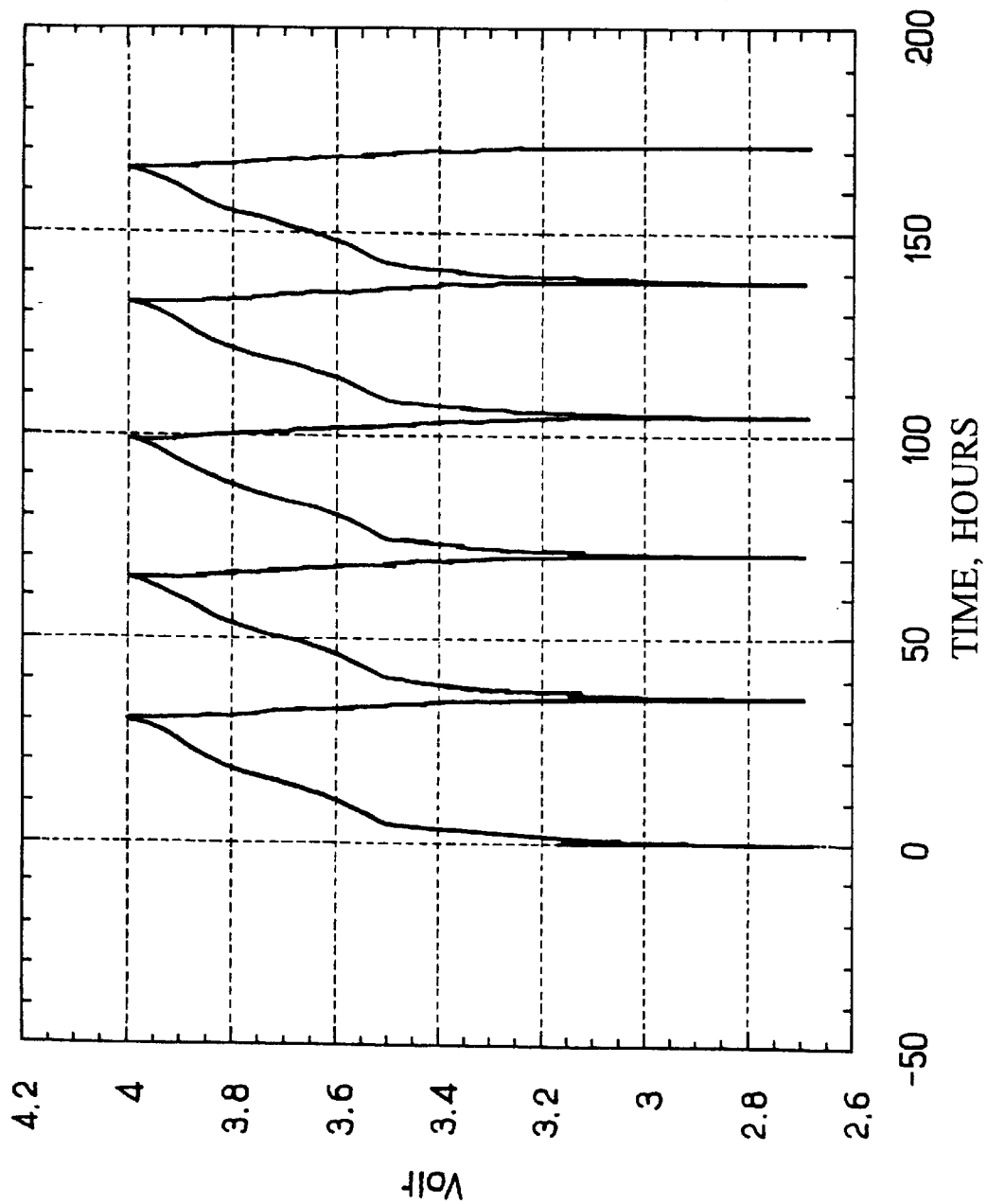
FIG. 1 shows the evolution during cycling of the voltage of a cell comprising a separator of the invention. The voltage of the cell (in volts) is plotted on the ordinate axis, and the time (in hours) is plotted on the abscissa axis.
Figure 2:
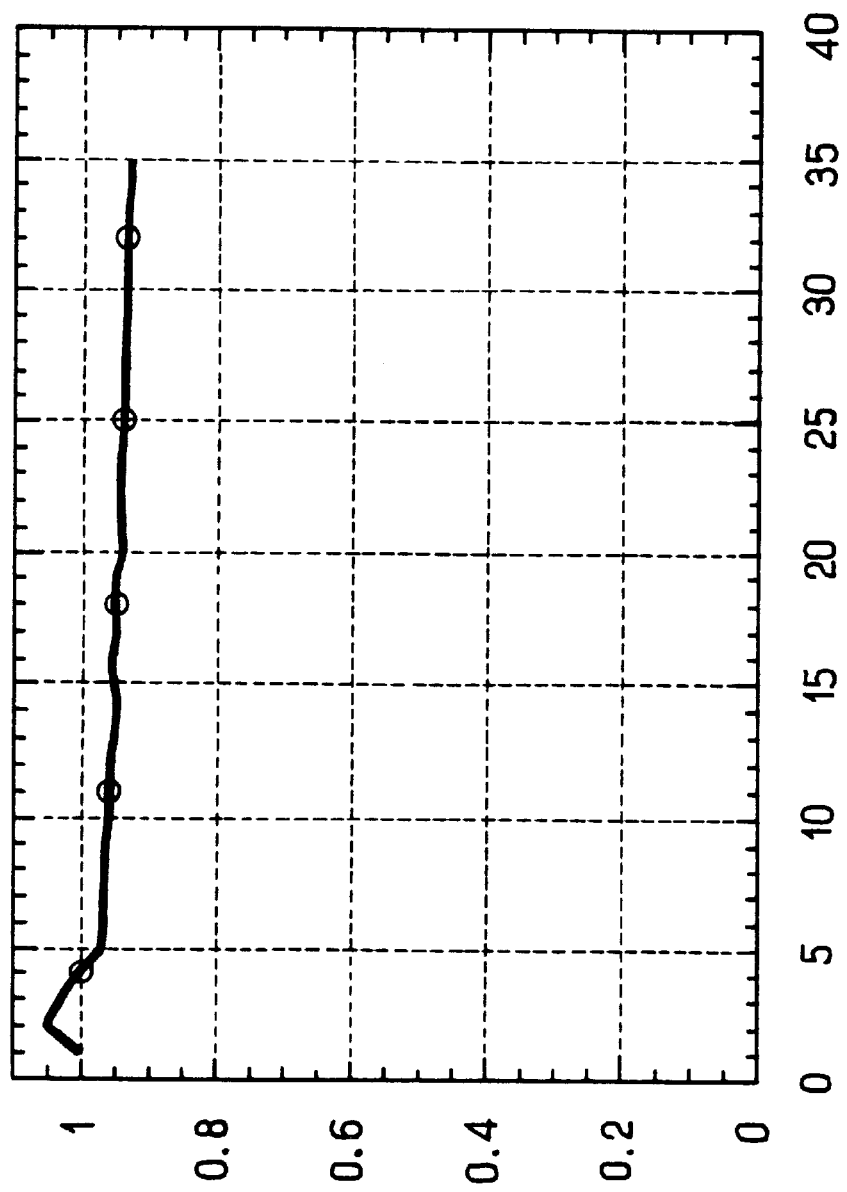
FIG. 2 shows the evolution during cycling of the ratio of the capacity at the Nth cycle to the capacity on the first discharge of a cell comprising a separator of the invention. The ratio of the capacity at the Nth cycle to the capacity on the first discharge of the cell is plotted on the ordinate axis and the number of cycles is plotted on the abscissa axis.

FIGS. 1 and 2 respectively show the evolution of the voltage and the ratio of the capacity on the Nth cycle to the capacity at the first discharge of the cell during cycling.

It can be seen that the capacity was stable during cycling.

There is claimed:

1. An organic electrolyte electrochemical system including a polymeric separator comprising:
   a) an elastomeric polymer selected from the group consisting of an acrylonitrile-butadiene copolymer, a styrene-butadiene-styrene copolymer, a styrene-isoprene-styrene copolymer, polyesters and block amid polyethers; and
   b) a polymer which swells in an organic electrolyte selected from the group consisting of polyvinylidene fluoride and its copolymers, polymethylmethacrylate, polyvinylformal, polybutylmethacrylate and polyvinyl chloride, and with which said elastomeric polymer forms an alloy, said polymeric separator having a microporous structure with a porosity in the range 30% to 95% and pores with an average diameter in the range 0.1 $\mu$m to 5 $\mu$m.

2. The organic electrolyte electrochemical system claimed in claim 1 wherein the average pore diameter is in the order of 1 $\mu$m.

3. The organic electrolyte electrochemical system claimed in claim 1, wherein said polymeric separator further comprises an inorganic compound.

4. The organic electrolyte electrochemical system claimed in claim 3 wherein said inorganic compound is silica.

5. The organic electrolyte electrochemical system as claimed in claim 3 containing at least 40% of said elastomeric polymer, no more than 60% of said polymer which swells in said electrolyte and no more than 20% of said inorganic compound.

6. The organic electrolyte electrochemical system claimed in claim 1, wherein said polymeric separator does not include a support sheet therein.

7. An organic electrolyte electrochemical system including a polymeric separator consisting essentially of:
   a) an elastomeric polymer selected from the group consisting of an acrylonitrile-butadiene copolymer, a styrene-butadiene-styrene copolymer, a styrene-isoprene-styrene copolymer, polyesters and block amid polyethers; and
   b) a polymer which swells in an organic electrolyte selected from the group consisting of polyvinylidene fluoride and its copolymers, polymethylmethacrylate, polyvinylformal, polybutylmethacrylate and polyvinyl chloride, and with which said elastomeric polymer forms an alloy, said polymeric separator having a microporous structure with a porosity in the range 30% to 95% and pores with an average diameter in the range 0.1 $\mu$m to 5 $\mu$m.

* * * * *